United States Patent
Fazakas

(10) Patent No.: US 7,446,583 B2
(45) Date of Patent: Nov. 4, 2008

(54) SWITCHING ARRANGEMENT FOR INTERCONNECTING ELECTROLYTIC CAPACITORS

(76) Inventor: András Fazakas, Benczúr u. 39/b. V. em., Budapest (HU) H-1068

( * ) Notice: Subject to any disclaimer, the term of this patent is extended or adjusted under 35 U.S.C. 154(b) by 76 days.

(21) Appl. No.: 10/589,570

(22) PCT Filed: Feb. 16, 2005

(86) PCT No.: PCT/HU2005/000017

§ 371 (c)(1),
(2), (4) Date: Aug. 16, 2006

(87) PCT Pub. No.: WO2005/078888

PCT Pub. Date: Aug. 25, 2005

(65) Prior Publication Data

US 2007/0194816 A1   Aug. 23, 2007

(30) Foreign Application Priority Data

Feb. 16, 2004   (HU) .................................. 0400421

(51) Int. Cl.
*H03H 1/04* (2006.01)
(52) U.S. Cl. ...................... 327/261; 327/290
(58) Field of Classification Search ............. 327/261, 327/284, 290, 434, 545, 546; 361/15, 28; 363/53
See application file for complete search history.

(56) References Cited

U.S. PATENT DOCUMENTS

| | | | |
|---|---|---|---|
| 4,656,451 A | | 4/1987 | Pomponio |
| 5,122,724 A | * | 6/1992 | Criss .......................... 323/222 |
| 5,155,648 A | * | 10/1992 | Gauthier ...................... 361/58 |
| 5,559,656 A | * | 9/1996 | Chokhawala ................. 361/18 |
| 5,930,130 A | * | 7/1999 | Katyl et al. .................... 363/53 |
| 6,178,104 B1 | * | 1/2001 | Choi ............................ 363/89 |
| 6,479,969 B1 | | 11/2002 | Fazakas |
| 6,628,532 B1 | * | 9/2003 | Rinne et al. ............... 363/21.06 |

(Continued)

OTHER PUBLICATIONS

Anonymous: "Advanced Design System 2002-Circuit Components Nonlinear Devices" 'Online! Feb. 1, 2002, Agilent Technologies, XP002330952 Retrieved from Internet: URL:http://eesof.tm.agilent.com/docs/adsdo C2002/pdf/ccnld.pdf> 'retrieved on Jun. 8, 2005! Described a model of the FET pp. 6-9-6-10.

*Primary Examiner*—N. Drew Richards
*Assistant Examiner*—Hai L. Nguyen
(74) *Attorney, Agent, or Firm*—Norman N. Kunitz; Fitch, Even, Tabin & Flannery

(57) ABSTRACT

Switching arrangement for interconnecting electrolytic capacitors that comprises an electronic switch formed by a semiconductor device and a delay member. The semiconductor device has a control input which is, through an RC-type delay member, connected to a control input (VS) supplying the switching signal. The switching arrangement has a predetermined switching delay. The semiconductor device is a field effect transistor (FT), whose main circuit is coupled through an inductive element (L), supplying a second delay, to the capacitor (C1) to be switched. The inductive element (L) is a conductor (10) of determined length surrounded by a high-frequency ferrite core (11, 12). The delay effected by the RC member ensures only that fraction of the switching delay at which the device is loaded within its permissible load limit and the remaining delay is supplied by the inductive element (L).

7 Claims, 2 Drawing Sheets

U.S. PATENT DOCUMENTS 6,646,842 B2 * 11/2003 Pan et al. .................... 361/58
6,703,889 B2 *  3/2004 Dodson, III ................ 327/434
6,831,447 B1 * 12/2004 Wittenberg ................ 323/222

* cited by examiner

SWITCHING ARRANGEMENT FOR INTERCONNECTING ELECTROLYTIC CAPACITORS

CROSS REFERENCE TO RELATED APPLICATION

This application is the National Stage filing under 35 U.S.C. 371 of International Application No. PCT/HU2005/000017, filed Feb. 16, 2006, and claims the priority of Hungarian patent application No. P0400421, filed Feb. 16, 2004, the subject matter of which is incorporated, in their entireties, by reference.

BACKGROUND OF THE INVENTION

The invention relates to a switching arrangement for a controlled parallel switching of an electrolytic condenser of at least 500 µF capacitance to another, energy-storing electrolytic condenser. The arrangement includes an electronic switch formed by a semiconductor device and a delay member at which the semiconductor device has a control input and the input is connected through an RC-type delay member to a control input which supplies the switching signal. The switching arrangement has a switching delay of determined duration.

Upon suddenly discharging or charging condensers charged with energy, during a given period very large transient currents flow which may damage both the condenser and the switching device that effects the transient process.

In the Hungarian published patent application No. P 9902383 a battery-charging circuit is disclosed which includes a condenser. A switch increases the capacity of the condenser by switching another condenser in parallel therewith. As shown in FIG. 4 of the patent application referred to, a series LC member is inserted into the switching path.

The capacity of the condenser to be charged has a capacity of typically 100-10000 µF, but is advantageously in the 500-10000 µF range. The most wide-spread semiconductor switching device is the MOSFET-type field effect transistor, whose inner resistance is very small in the open state and which may be easily opened and closed at a very high input impedance.

The switching performance of field effect transistors adapted for switching large currents is constantly on the increase, but in any given type currents in excess of a given intensity endanger the soundness of the transistor. In the exemplary use, the maximum permissible current intensity is 180 A. When field effect transistors are used as switching devices, the heat dissipating on the semiconductor device during the transient switching process also constitutes a barrier. In the open state the residual voltage of the field effect transistor is very low, it is typically in the 50 mV range; for this reason the power loss in such a transistor is very small even in case of large currents. During the transient switching process, however, the risks are very substantial that the field effect transistor is exposed to loads greater than the permissible limit values.

Thus, when switching large energies, attention has to be given to loads to which the switching device proper is allowed to be exposed, and also to the maximum load permissible for the switched circuit. The load on the switched circuit may be reduced by delaying the transient process. At the same time, in given applications it is also an object to ensure that the switching itself affects the transient processes appearing in the switched circuit only to the extent as absolutely necessary, that is, up to a prevention of exceeding the limits determined for the components.

Inductive elements are routinely used in the main circuit of the switched circuit for purposes of delay. A problem involved in the use of an inductive element is that the inductivity necessary for effecting the delay can be obtained only with an ohmic resistance of given magnitude, and the presence of the ohmic component in the main circuit causes a continuous loss and adversely affects therein the processes which are no longer transient switching events.

In the uses noted in the above-mentioned Hungarian patent application, boundary conditions develop at which the delay period necessary for the transient process is longer than what the usual electronic semiconductor devices are able to tolerate by way of thermal stress derived from the switching transient in case of currents in the range of 100-200 A. At the same time, such delay period is short enough to render the generally applied inductive delay elements unusable because of the existence of the ohmic component appearing when the required inductivity value is achieved.

Because of the described contradictory requirements, that is, where to a large-capacity electrolytic condenser containing large energy another, energy-less, but also large-capacity electrolytic condenser has to be connected in parallel and where it is a requirement to affect the developing transient processes as little as possible, such task could be solved heretofore only with opening and closing contacts. Solutions utilizing mechanical contacts, however, are disadvantageous as concerns their cost speed, the comfort of control and their low-level reliability as compared to the use of otherwise comfortable, rapid and reliable electronic devices.

SUMMARY OF THE INVENTION

It is an object of the invention to provide a switching arrangement for an electrolytic condenser having a capacity of at least 500 µF and used for the controlled parallel switching of another, energy-storing electrolytic condenser, in which the switching element is formed by a semiconductor device and which is capable of protecting both the semiconductor device and the connected electrolytic condensers from the damaging effect of current surges appearing as switching transients but which, at the same time, affects the switching process only to the extent necessary for the protection.

For achieving the above object it was recognized that the protection against the switching transients may be solved in a divided manner. Thus, one part of the required delay is ensured by an RC member formed at the gate electrode of a field effect transistor and utilizing predominantly only the own input capacity of the gate electrode of the device. The extent of the first delay is determined based on the load limit value of the field effect transistor. The necessary additional delay is ensured by an inductive member passed through the bore of a ferrite core. The inductive member has a very low ohmic resistance and has a single turn, or a few turns at the most. The inductive member is connected in series with the main circuit of the semiconductor device.

Thus, according to the invention a switching arrangement is provided for the controlled parallel switching of an at least 500 µF capacity electrolytic condenser to another, energy-storing electrolytic condenser. The switching arrangement comprises an electronic switch formed by a semiconductor device and a delay member. The semiconductor device has a control input which is, through an RC-type delay member, connected to a control input which supplies the switching signal. The switching arrangement has a switching delay of predetermined extent. According to the invention the semiconductor device is a field effect transistor, whose main circuit is coupled to the condenser to be switched through an inductive element effecting a second delay. The inductive element is a conductor of determined length surrounded by a high-frequency ferrite core. Further, the delay effected by the RC member ensures only that fraction of the defined switching delay which is required for a load within the load limit of the field effect transistor. The remaining delay is supplied by the inductive element.

By virtue of the division and the particular configuration of the inductive element proposed by the invention, as a particular compromise of conflicting requirements a solution could be obtained which satisfies all conditions. According to the inventive solution the thermal load affecting the field effect transistor is within the permissible range during the switching transient. Further, the peak magnitude of the current on the electrolytic condensers does not exceed the level which would cause damage thereto. At the same time, the switching and the required delay introduce only a minimum ohmic loss into the main circuit, whose functioning is therefore basically unaffected by the presence of circuits necessary for the switching process.

According to an advantageous embodiment the ferrite core has two bores having parallel axes and spaced from one another at a given distance. Further, the conductor has two legs passed through the respective bores.

In accordance with an expedient structural embodiment the ferrite core has a plurality of short, stacked ferrite cores. The ferrite core, however, may also consist of a single, long, narrow piece.

In a further advantageous embodiment the capacitive element in the RC member is constituted by the input capacity of the field effect transistor and the unavoidable scattered capacities.

The capacity of the electrolytic condensers is typically in the 10,000 µF range.

The switching arrangement according to the invention makes possible for the given task the use of the rapid, inexpensive and reliable field effect transistor as a switching device to thus dispense with mechanical contacts.

BRIEF DESCRIPTION OF THE DRAWINGS

Further details of the solution according to the invention will become apparent by way of exemplary embodiments in conjunction with the drawing, where.

DETAILED DESCRIPTION OF THE INVENTION

Figure 1:
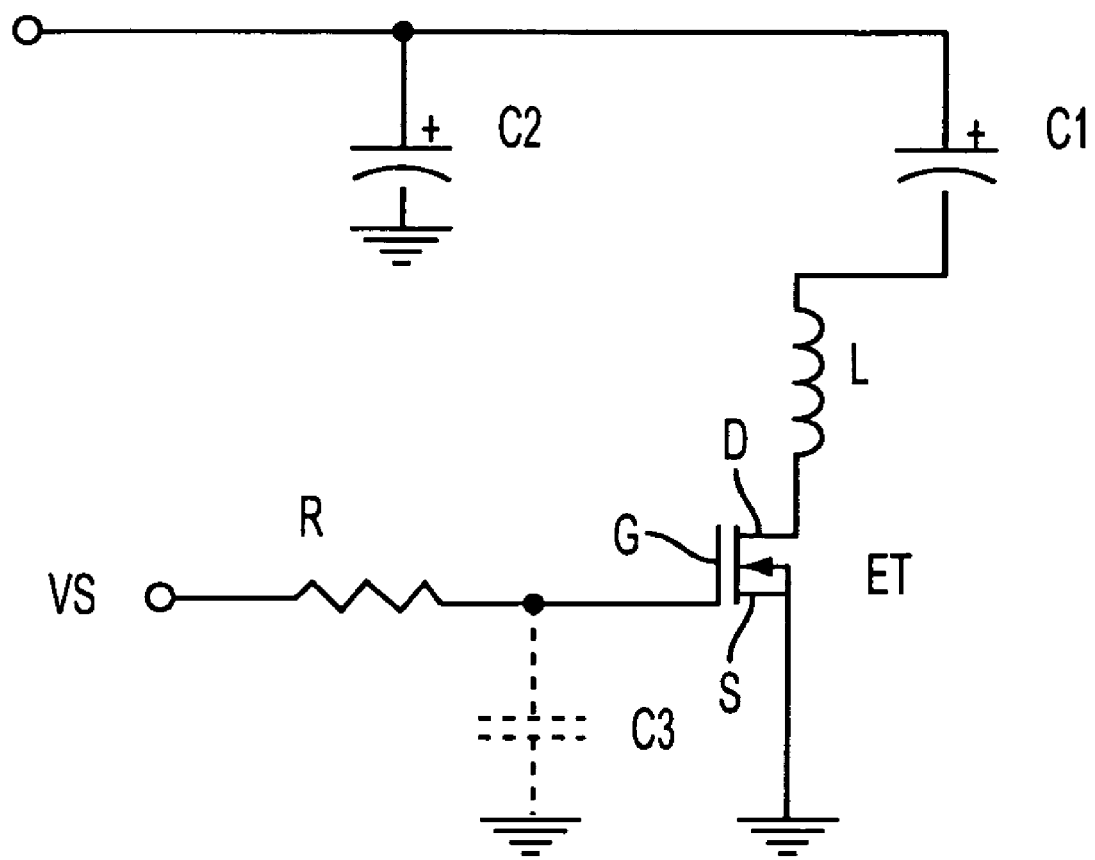
FIG. 1 is a circuit diagram of the principle of the switching arrangement according to the invention.

It is the basic task of the switching arrangement shown in FIG. 1 to connect in parallel, or disconnect from one another, a large-capacity electrolytic condenser C1, having a capacity of at least 100 µF, but expediently of much larger capacity, such as in the range of 500-10000 µF, and a likewise large-capacity electrolytic condenser C2. The condensers C1 and C2 may be positioned, according to the arrangement shown in FIG. 4 of the earlier-noted Hungarian patent application, in the charging circuit of a non-illustrated battery. One of the armatures of each condenser C1 and C2 are connected to one another and have a potential of varying magnitude with respect to ground; in the given example a significant positive potential is present. In the path between the other (in this instance negative) armature and ground an electronically controlled switch is disposed, whose switching element is formed by a field effect transistor FT. An inductive element L designed for a large current intensity is connected in series with the path between the source electrode S and the drain electrode D of the field effect transistor FT. The construction of the inductive element L is critical, because its d.c. resistance should be minimal, otherwise the current which is generated during charging or discharging and which may reach an intensity of several hundred amperes, would cause substantial losses. Between the gate electrode G of the field effect transistor FT and ground a virtual capacity is present which is determined by the inner capacity of the device and the scattered capacities. In FIG. 1 the virtual capacity is represented in broken lines by a virtual condenser C3, whose typical capacity is 50-100 pF. The gate electrode G is joined by a resistance R, whose other end constitutes the control input VS of the switching device.

FIGS. 2-5 illustrate various structures of the inductive element L. The inductive element L has a two-legged, U-shaped conductor 10 formed in the example by a copper or silver-plated copper wire and a ferrite core 11 or 12 (FIGS. 3 and 5, respectively) provided with two bores having parallel bore axes and being at a determined distance from one another. The distance between the legs of the conductor 10 corresponds to the distance between the bore axes. In the embodiment shown in FIG. 2 the length of the conductor 10 corresponds to the length of a plurality (for example, 6-10) of short ferrite cores 11. The legs of the conductor 10 are passed through the bores of the short ferrite cores 11 which thus form a stack on the conductor 10. The adjoining ferrite cores 11 are expediently affixed to one another and to the conductor 10 by gluing. As concerns the configuration of the finite core 11, it is identical to ferrite core structures used widely in symmetrical/asymmetrical transformers (balun transformers) in other fields of application. The inductive element L structured in such a manner has a very low ohmic resistance, and a just-suitable inductivity. In case the diameter of the conductor 10 is 1 mm and its length allows 10 ferrite cores 11 to be stacked thereon, the measured inductivity is 71.7 µH at a frequency of 1 kHz and 70 µH at a frequency of 100 kHz.

Figure 2:
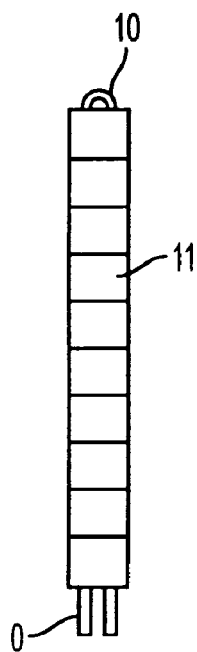
FIG. 2 is a schematic view of a first embodiment of the inductive element.
Figure 3:
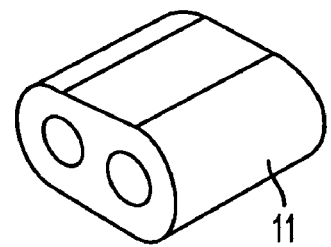
FIG. 3 is a perspective view of a first ferrite core.
Figure 4:
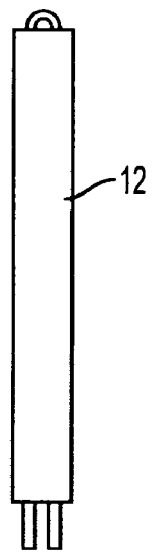
FIG. 4 is a schematic view of a second embodiment of the inductive element.
Figure 5:
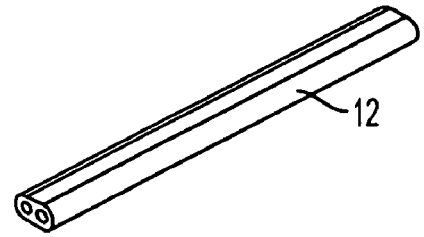
FIG. 5 is a perspective view of a second ferrite core.

The embodiment illustrated in FIGS. 4 and 5 differs from the embodiment in FIGS. 2 and 3 in that instead of stacked ferrite cores 11, it includes a single, long ferrite core 12, configured specially for the invention.

The long, narrow configuration of the inductive element L is advantageous as concerns its accommodation in the utilized device, because its volume is large only in a single direction. Thus, in case of a vertical orientation of such an inductive element L, a relatively large number may be disposed in a small areas For understanding the operation of the switching device according to the invention, it is assumed that a large positive voltage of, for example, 40-50 V is measured between ground and that electrode of the condenser C2 which is connected to the condenser C1, and a sudden voltage in the opening direction (that is, a voltage positive relative to ground) is applied to the input VS which was earlier at ground potential. The sudden voltage appears on the gate electrode G already with a slight run-up delay caused by the RC member formed by the resistance R and the virtual condenser C3. The resistance R is typically in the range of 150 kΩ. Based on these data the delay period attributed to the RC member will be typically about 0.075-0.15 μs. The field effect transistor FT will assume its open state with such a delay, and a short circuit occurs between the drain electrode D and the source electrode S (apart from a residual voltage in the order of magnitude of about 50 mV). During the transient event heat loss appears on the field effect transistor FT, when the voltage between the drain electrode D and the source electrode S is not yet zero, but the current is already at an appreciable level. The delay obtained on the input side is still too short to limit the starting current to a magnitude which the condenser C1 too, can tolerate. If the time constant is increased by increasing the value of either the resistance R or the condenser C3, the thermal load on the field effect transistor FT would be increased which would be intolerable for the device.

The inductivity of the inductive element L, however, causes an additional run-up delay which, because of the small ohmic resistance of the device, generates only very little heat, and for the dissipation of such heat a very large surface is available. The presence of the separate inductive delaying element placed outside of the field effect transistor reduces the heat quantity absorbed by the field effect transistor during the transient process, because the inner resistance of the device assumes its minimum value during the input time delay, and at that delay time the current increase is still limited. The two components of the delay have jointly an effect, during which the field effect transistor FT too, operates within the permissible limit values, and also, upon charging the condenser C1, the current maximum does not exceed a permissible peak value. The selected configuration for the inductive element L ensures a very low ohmic resistance at a suitable inductivity value. The complete run-up delay, however, is not greater than necessary for the safe operation of the utilized devices and elements, so that the signal shape of the current is determined by the properties of the main circuit which includes the condensers C1 and C2.

By virtue of the fact that instead of alternative solutions which involve much greater volumes and greater losses, a field effect transistor FT may be used, switching may be effected with smaller physical dimensions, reduced costs and more advantageous electric parameters.

The invention claim is:

1. A switching arrangement for the controlled parallel switching of a first energy-storing electrolytic condenser (C1) with a second energy-storing electrolyte condenser (C2) in response to a switching signal supplied to a control input (VS), said first electrolytic condenser (C1) has a capacity of at least 500 μF; said second electrolytic condenser has a likewise large capacity, the switching arrangement comprises an electronic switch formed by the main circuit of a semiconductor device being a field effect transistor (FT) with a gate electrode connected through an RC-type delay member to the control input (VS); wherein for protecting both the field effect transistor (FT) and the connected electrolytic condensers (C1, C2) from the damaging effect of current surges appearing as switching transients but which, at the same time, affects the switching process only to the extent necessary for the protection, the rising of the current in said main circuit is delayed, wherein the delay is provided by two delay members, the first delay member is constituted by said RC-type delay member, the second delay member being an inductive element (L) connected in the main circuit of the field effect transistor (FT), the inductive element (L) is constituted by a conductor (10) of predetermined length surrounded by a high-frequency ferrite core (11, 12); the delay effected by the RC member ensures only a fraction of the full switching delay.

2. The switching arrangement as defined in claim 1, wherein the ferrite core (11, 12) has two bores which are at a predetermined distance from one another and which have parallel axes; the conductor (10) has two legs passed through the bores.

3. The switching arrangement as defined in claim 2, wherein it comprises a plurality of short, stacked ferrite cores (11).

4. The switching arrangement as defined in claim 1, wherein in the RC member the capacitive element is formed by the input capacity of the field effect transistor (FT) and the unavoidable scattered capacities.

5. The switching arrangement as defined in claim 1, wherein the capacity of the switched electrolytic condensers is in the range of 10,000 μF.

6. A switching arrangement for the controlled connecting in parallel of a first energy-storing electrolytic condenser with a second energy-storing electrolyte condenser in response to a switching signal supplied to a control input, said first electrolytic condenser has a capacity of at least 500 μF; said second electrolytic condenser has a likewise large capacity, with the first and second condensers each having one terminal connected to a common terminal for a source of variable voltage, and a second terminal connected to ground, and the switching arrangement comprises an electronic switch connected between the second terminal of the second condenser and ground and formed by the main circuit of a semiconductor field effect transistor having a gate electrode connected through an RC-type delay member to a control input; and wherein for protecting both the field effect transistor and the connected electrolytic condensers from the damaging effect of current surges appearing as switching transients but which, at the same time, affects the switching process only to the extent necessary for the protection, the rising of the current in said main circuit is delayed, wherein the delay is provided by two delay members, the first delay member is constituted by said RC-type delay member, and the second delay member being an inductive element connected in the main circuit of the field effect transistor, with the inductive element being a conductor of predetermined length surrounded by a ferrite core; the delay effected by the RC member ensuring only a fraction of the full switching delay.

7. The switching arrangement as defined in claim 6, wherein the ferrite core is formed of a high-frequency ferrite material.

* * * * *